Figure 1:
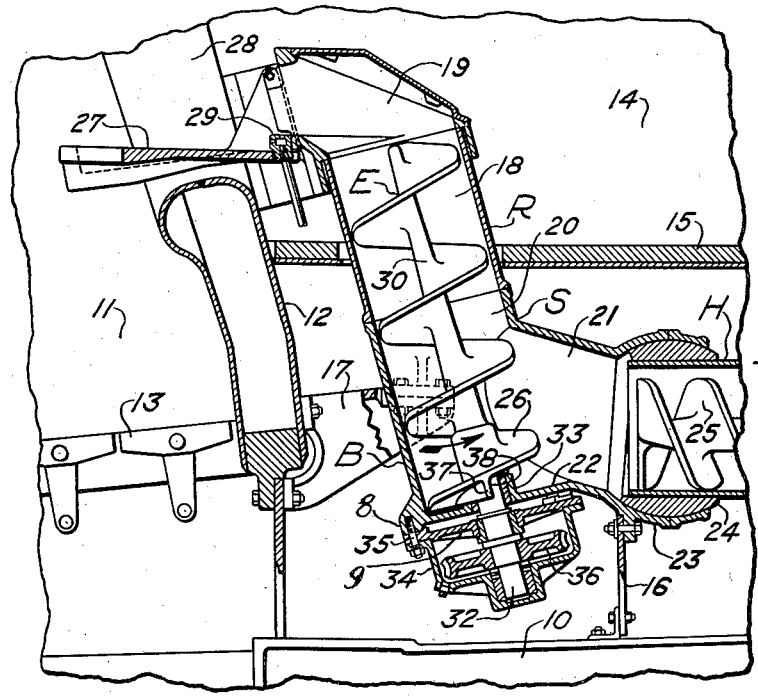

March 2, 1937. H. E. LIPPERT 2,072,406

CONVEYER

Original Filed Jan. 16, 1934

INVENTOR

Henry E Lippert

Patented Mar. 2, 1937

2,072,406

UNITED STATES PATENT OFFICE 2,072,406

CONVEYER

Henry E. Lippert, Pittsburgh, Pa.

Application January 16, 1934, Serial No. 706,841
Renewed November 2, 1935

14 Claims. (Cl. 198—15)

This invention relates to conveyers and particularly to conveyers for transferring fuel, such as stokers.

In one form of locomotive stoker, a transfer screw in a horizontal conduit beneath the tender and locomotive decks is arranged to deliver fuel to elevating screws in riser or elevator conduits on the locomotive, and the path of the fuel through the stoker changes at an abrupt angle at the adjacent ends of the conduits. When this stoker is in operation to convey fuel from the tender to the locomotive firebox, the fuel is moved through the horizontal conduit by the transfer screw therein and discharged onto the lower ends of the helical vanes of the elevating screws, which latter screws raise the fuel in the riser conduits to the proper height for its discharge onto the firebox grates. To release and remove a piece of foreign matter which may become lodged between one of the riser conduits and the screw within the same, it is sometimes necessary to change the normal direction of rotation of this elevating screw and the transfer screw, thereby reversing the direction of travel of the fuel through the stoker. The piece of foreign matter will then be loosened and may be moved to a point in the stoker conduit convenient for permitting its removal. Continued operation of one or both of the elevating screws and the transfer screw in the direction opposite to their normal direction of rotation, to convey the foreign matter from one of the riser conduits to the tender end of the horizontal conduit, results in packing of the fuel at the juncture of the conduits.

When the stoker is functioning to deliver fuel to the firebox, the screw in the horizontal conduit discharges the fuel in the general direction of the elevating screws. Upon reversing the direction of travel of the fuel through the stoker, the elevator screws do not discharge the fuel toward the screw in the horizontal conduit, but instead, they discharge it downwardly against and toward the bottom walls of the riser conduits. The fuel becomes packed to the extent that the pressure of the lumps and particles of fuel upon one another causes the packed fuel to move in the direction of least resistance, which is toward the screw in the horizontal conduit, since the horizontal conduit opens into the lower ends of the riser conduits. It is in this manner that the fuel in the riser conduits passes to the horizontal conduit when rotation of the screws is reversed.

When the normal direction of rotation of the screws is changed for a period of time sufficient to permit the foreign matter to be moved from one of the riser conduits to the tender end of the horizontal conduit, the fuel is forced by the elevating screws against the bottom walls of the riser conduits and the lumps and particles are reduced to a powdered or pulverized form, thus rendering the fuel inefficient for firing, since an objectionably large percentage of the minute particles is carried by the draft through the firebox out of the stack partially unburned. Such operation of the stoker may cause the fuel to be packed so tightly as to render the device inoperable or cause breakage of some of the parts. Should the foreign matter become wedged between the vane of one of the elevating screws and the bottom wall of the riser conduit enclosing that screw, the same result would occur.

It is among the objects of the present invention to provide in stokers of the above character, and stokers of similar design, a means for reducing packing and pulverization of the fuel at the juncture of the angularly disposed conduits.

Another object is to provide means for preventing packing of fuel against the end wall of a stoker conduit when the normal direction of travel of the fuel through the conduit is reversed.

Another object of this invention is the provision, at the adjacent ends of two communicating angularly disposed stoker conduits, of means for discharging fuel or foreign matter from one conduit to the other when the normal direction of travel of the fuel through the conduits is reversed.

Still another object is to provide means for reducing the leakage of fuel through a screw shaft bearing in the end wall of a stoker conduit.

A further object of the invention is the provision of a conveyer screw of novel formation, which will serve to normally convey fuel through a stoker conduit upon rotation in one direction and function to attain the aforesaid objects of this invention upon rotation in the opposite direction.

On the accompanying drawing, forming a part hereof,—

Figure 3:
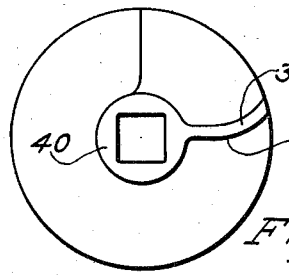
Figure 2:
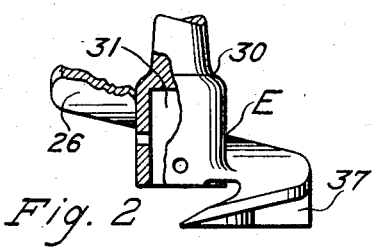
Figure 4:
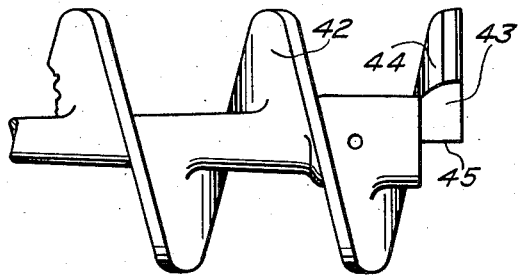
Figure 5:
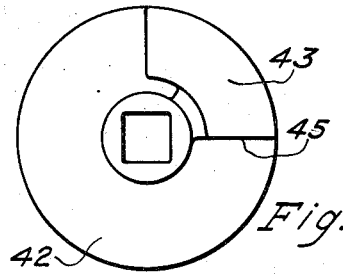

Fig. 1 is a vertical longitudinal central sectional view of a portion of a locomotive and a portion of a stoker embodying the present invention, showing the stoker applied to the locomotive, Fig. 2 is an enlarged view of the lower end of the improved conveyer screw disclosed in Fig. 1 rotated ninety degrees about its axis, with a part of the screw broken away, Fig. 3 is an end view of a slightly modified conveyer screw, and Figs. 4 and 5 are side and end views, respectively, of a conveyer screw illustrating another modification.

Like numerals and reference characters in the various figures of the drawing indicate corresponding elements or features of construction herein referred to. Referring to Figs. 1 and 2 of the drawing, the numeral 10 designates the locomotive frame; and 11, the firebox having a backhead 12 and grates 13. The cab of the locomotive is shown at 14 and the cab deck at 15.

A stoker S is composed of a horizontal conduit H and a riser conduit R. The invention is shown applied to a stoker having a single riser or elevator conduit for clarity, it being apparent that the invention may be used with forms of stokers employing a plurality of elevators. The stoker S is supported upon the locomotive frame by a plate 16. The riser conduit R is rigidly attached to the backhead by means of a bracket 17, and it may also be secured to the backhead adjacent its upper end in any desirable manner. This riser conduit extends along the backhead 12 and is disposed at an angle of nearly ninety degrees with the horizontal conduit H. A base member B, a cylindrical casing 18, and a hood member 19 all rigidly connected together comprise the riser conduit.

The base member B is formed of an upright cylindrical conduit section 20, a cylindrical conduit section 21, and a bottom wall 22 integral with each other. The rear end of conduit section 21 terminates in a spherical flange 23 which receives a ball member 24. The horizontal conduit H is supported in the ball member 24 and extends rearwardly beneath the fuel bunker of a locomotive tender (not shown) to receive fuel therefrom.

When the stoker is functioning to deliver fuel to the firebox, the fuel is moved forwardly through the conduit H by a transfer screw 25 and is discharged forwardly from the front end of screw 25 onto the helically formed vane 26 of an elevating screw E. The elevating screw raises the fuel in the riser conduit and discharges it onto a distributor plate 27 extending through the firing opening 28 in the locomotive backhead. Blasts of pressure fluid issuing from jet openings in a distributor head 29 discharge the fuel from the distributor plate to all parts of the firebed on the grates 13.

The helical vane 26 of screw E is formed on a hub 30, and this hub is recessed at 31 to receive the upper end of a stub shaft 32 to which the screw E is fastened. The shaft 32 is mounted for rotation in a bearing 33 provided on the bottom wall 22 of the riser conduit and extending upwardly within the conduit passage. This stub shaft extends exteriorly of the riser conduit and is further supported in suitable bearings in a gear case 34. The gear case is attached to the lower end of the riser conduit by bolts 35. Gear case 34 engages downwardly extending bosses 8 formed on the riser conduit so that the top wall 9 of the gear case is spaced from the bottom wall 22. A worm wheel 36 within the gear case is fixed on the shaft 32 and may be rotated in either direction by power transmitting mechanism (not shown).

The lower end of the helical vane 26 of the elevating screw terminates below the lower end of the hub 30, and in operation, the lower end of vane 26 rotates about the bearing 33. The lower end of the hub 30 terminates above this bearing. Provided on the bottom of the helical vane 26 which extends below the lower terminus of the hub 30 is a lug or projection 37 having a face 38 disposed radially with respect to the axis of the hub 30. The projection 37 extends downwardly from the underside of the vane 26 to the bottom wall 22.

The lower edge of projection 37 and the lower end of helical vane 26 terminate in a common plane perpendicular to the axis of screw E, and the projection and vane extend downwardly as close as possible to the upper or inside surface of bottom wall 22 without contacting this wall. The fuel pushing face 38 on screw E extends vertically between the underside of vane 26 and the wall 22, and it extends laterally between the bearing 33 and the inside surface of conduit section 20. Hence, this face is wholly within the confines of the cylinder described by rotation of helical vane 26. The face 38 is spaced a portion of a turn (preferably less than half a turn) from the lower terminus of vane 26 about the axis of the screw. By extending a lower portion of vane 26 beyond the face 38, this face acts to discharge the fuel away from the axis of screw E only when the screw is in reverse drive, and it is inoperable to act upon the fuel when the screw is in forward drive. By extending the helical vane 26 to the plane of the upper surface of wall 22, fuel is elevated directly from the wall by action of the vane when screw E is in forward drive.

When the normal direction of rotation of the elevating screw E is reversed, for the purpose set forth in the beginning of this specification or other reasons, it will rotate in the direction indicated by the arrow in Fig. 1, and the projection 37 will discharge fuel descending in the riser conduit in a lateral direction through the conduit section 21 to the transfer screw 25 in the horizontal conduit. Packing and pulverization of the fuel at the juncture of the riser and horizontal conduits is thus considerably reduced. Since the projection 37 rotates over the top surface of the end or bottom wall 22 of the riser conduit, it is obvious that packing of the fuel against this wall is eliminated. Foreign matter that may get into the stoker conduit is prevented from becoming wedged between the vane 26 of the elevating screw and the wall 22 by the projection 37, which will discharge any such foreign matter to the screw 25 along with the fuel. Since the lower end of the hub 30 of the elevating screw is spaced above the wall 22, and the bearing 33 extends upwardly to the hub, and packing of the fuel against the wall 22 is prevented by the projection 37, it is apparent that the leakage of fuel out of the bearing 33 around the stub shaft 32 is greatly reduced. The loss of fuel in this manner is not objectionable, but the fact that a certain amount of the fuel lost through a screw shaft bearing at the end of a stoker conduit usually finds its way into the adjacent gear case causing unnecessary wear on the parts therein is objectionable. Unless this fuel which accumulates in the gear case is removed, the stoker in time will be rendered inoperable. The top wall 9 of the gear case is provided with a shaft bearing spaced slightly from the bearing 33, thereby providing an interrupted bearing surface for shaft 32 between screw E and gear 36. Fuel particles that may leak through the bearing 33 can therefore pass into the intervening space between walls 9 and 22. Such leakage will escape from the space between the conduit and gear case exterior of both and fall onto the locomotive frame 10, due to the vibration of the locomotive.

In Fig. 3, a projection 39 is shown provided on the hub 40 of a fuel conveyer screw, instead of on the vane thereof, and the fuel pushing face 41 of the projection is slightly curved to increase the effect of the projection 39 to discharge fuel in a direction away from the axis of the hub. When in reverse drive, this screw turns in clockwise direction.

In Figs. 4 and 5, the helical vane 42 terminates in a solid wedge-shaped block 43. The surface 44 of the wedge-shaped block forms a continuation of one surface of the helical vane 42. The block 43 is also provided with a radially disposed face 45.

Many modifications of the invention will be conceived, by those familiar with the art, upon disclosure of the accompanying drawing, and among the various structures coming within the scope of this invention are those having a projection for pushing fuel formed solely on the hub or solely on the helical vane of a fuel conveyer screw, or formed on both the hub and vane for obtaining the result or results herein described. Although the invention is shown on the drawing as applied to a stoker, its application is not limited thereto.

I claim:

1. In a conveyer, a conduit having an end wall and an opening adjacent said wall through which fuel is received, a screw within said conduit arranged to normally convey fuel therethrough upon rotation in one direction, said screw having a helically formed vane, and means on one side only of said vane having a fuel pushing face for preventing packing of the fuel against said wall and for discharging it laterally with respect to the axis of said screw only when the screw is rotated in the opposite direction, said face normally being inoperable to act upon the fuel.

2. In a conveyer, a conduit having an end wall and an opening adjacent said wall through which fuel is received, a screw within said conduit arranged to normally convey fuel therethrough upon rotation in one direction, said screw having a helically formed vane, and a projection on one side of said vane having a fuel pushing face for discharging the fuel laterally with respect to the axis of said screw only upon rotation of the screw in the opposite direction, at least one helical surface of said vane extending substantially to the plane of the inside surface of said wall whereby said screw can convey the fuel directly from the wall, and said face normally being inoperable to act upon the fuel.

3. As a new article of manufacture, a conveyer screw having a helically formed vane and a projection provided with a face disposed substantially radially with respect to the axis of the screw, said face being spaced a portion of a turn from one end of said vane.

4. As a new article of manufacture, a fuel conveying screw having a helically formed vane and a projection on one side of said vane provided with a fuel pushing face, said face being spaced a portion of a turn from one end of said vane.

5. As a new article of manufacture, a fuel conveying screw composed of a hub, a helically formed vane, and a projection on said hub provided with a fuel pushing face, said face being spaced a portion of a turn from one end of said vane, and the edge of said face remote from said vane and said end of the vane both terminating in a common plane perpendicular to the axis of the hub.

6. As a new article of manufacture, a conveyer screw composed of a hub, a helically formed vane, and a projection provided with a face disposed substantially radially with respect to the axis of the hub, said face being spaced a portion of a turn from one end of said vane and lying within the confines of the cylinder described by rotation of the vane about the axis of the hub.

7. As a new article of manufacture, a conveyer screw composed of a helically formed vane, a hub at one end terminating short of the corresponding end of the vane, and a projection provided with a face disposed substantially radially with respect to the axis of the hub, said face being spaced a portion of a turn from one end of said vane.

8. As a new article of manufacture, a fuel conveying screw composed of a hub, a helically formed vane at one end extending beyond the corresponding end of the hub, and a projection on the extended part of the vane provided with a fuel pushing face, said face being spaced a portion of a turn from one end of said vane.

9. In combination in a conveyer, a riser conduit, a screw having a helically formed vane for normally receiving material and for elevating it through said conduit, means for normally delivering material to said screw, and means on said screw having a face spaced a portion of a turn from one end of said vane to discharge the material from said conduit to the first-named means only when the direction of travel of the material through said conduit is reversed, said second-named means normally being inoperable to act upon the material.

10. In combination in a conveyer, a conduit, a screw within said conduit having a helically formed vane for normally receiving material, a conduit communicating with the first-named conduit, a screw within the second-named conduit for normally delivering material to the first-named screw, and means on the first-named screw adjacent the juncture of said conduits having a face spaced a portion of a turn from one end of said vane to discharge the material from the first-named conduit to the second-named conduit only when the direction of travel of the material is reversed, said means normally being inoperable to discharge the material from one conduit to the other conduit.

11. In a conveyer, a riser conduit having a bottom wall, a screw within said conduit for normally receiving material and for elevating it through the conduit in a direction away from said wall, said screw having a helically formed vane provided with means on the underside thereof to form a material pushing face, a conduit communicating with the first-named conduit, and a screw within the second-named conduit for normally conveying and delivering material to the first-named screw, at least one helical surface of said vane extending downwardly substantially to the plane of the upper surface of said wall whereby said screw can elevate the material directly from the wall, and said face normally being inoperable to act upon the material and being arranged to discharge it to the second-named screw only when the material moves toward said wall.

12. In combination, a conduit having an end wall and an opening through which fuel is received, a screw for normally conveying fuel through said conduit in a direction away from said wall, said screw having a helically formed vane, and means on said screw having a face spaced a portion of a turn from one end of said vane for discharging fuel laterally with respect to the axis of said conduit upon reversing the direction of travel of the fuel through said conduit, said means being inoperable to discharge fuel laterally with respect to the axis of the conduit when the fuel is conveyed through the conduit in a direction away from said wall.

13. In a conveyer, a conduit having an end wall, said end wall being provided with a bearing, a helical screw within said conduit, a gear case carried by said conduit and having a wall lying adjacent said end wall, said gear case wall being provided with a bearing, a shaft mounted in said bearings and connected to said screw and extending within said gear case, and a gear on the portion of said shaft within said gear case, said bearings being spaced from each other to provide an interrupted bearing surface for said shaft between said screw and said gear.

14. In a conveyer, a riser conduit, a gear case at the lower end of said conduit, a helical screw within said conduit, a shaft connected to said screw and extending within said gear case, bearings for said shaft, a gear on the portion of said shaft within said gear case, a separable top wall for said gear case arranged to hold said shaft in position within said gear case and to hold said gear case in position on said conduit, and means for detachably securing said gear case and top wall in position on said conduit.

HENRY E. LIPPERT.